United States Patent
Pan

(10) Patent No.: US 7,657,236 B2
(45) Date of Patent: Feb. 2, 2010

(54) TRANSMITTER HAVING REDUCED LOCAL OSCILLATOR (LO) LEAKAGE BY DETERMINING DIRECT LO COUPLING AND BASEBAND DC OFFSET

(75) Inventor: Meng-An Pan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 355 days.

(21) Appl. No.: 11/204,339

(22) Filed: Aug. 16, 2005

(65) Prior Publication Data

US 2007/0042728 A1 Feb. 22, 2007

(51) Int. Cl.
*H04B 1/04* (2006.01)
(52) U.S. Cl. .................. 455/114.2; 455/115.1; 375/296
(58) Field of Classification Search ............. 455/114.2, 455/114.3, 115.1, 115.3, 118, 126; 375/296
See application file for complete search history.

(56) References Cited

U.S. PATENT DOCUMENTS

| | | | |
|---|---|---|---|
| 5,012,208 A | | 4/1991 | Mäkinen et al. |
| 5,396,196 A | * | 3/1995 | Blodgett ................ 332/103 |
| 5,675,286 A | * | 10/1997 | Baker et al. ............. 330/129 |
| 5,903,823 A | * | 5/1999 | Moriyama et al. ........ 455/126 |
| 6,169,463 B1 | * | 1/2001 | Mohindra et al. ......... 332/104 |
| 6,704,551 B2 | * | 3/2004 | Riou et al. .............. 455/115.1 |
| 6,999,744 B2 | * | 2/2006 | Kim ........................ 455/310 |
| 7,116,950 B2 | * | 10/2006 | Tanaka et al. ............ 455/125 |
| 7,206,557 B2 | * | 4/2007 | Aytur et al. .............. 455/118 |
| 7,280,805 B2 | | 10/2007 | Xu et al. |
| 7,440,732 B2 | | 10/2008 | Pan |
| 2002/0191713 A1 | | 12/2002 | McVey |
| 2006/0063497 A1 | | 3/2006 | Nielsen |
| 2006/0252392 A1 | * | 11/2006 | Beamish et al. ........... 455/126 |

* cited by examiner

*Primary Examiner*—Blane J Jackson
(74) *Attorney, Agent, or Firm*—Sterne, Kessler, Goldstein & Fox P.L.L.C.

(57) ABSTRACT

A transmitter generates a transmitter output signal from first and second baseband signals. The transmitter includes a detector to detect a local oscillator (LO) leakage signal in the transmitter output signal. A controller coupled to the detector determines a direct LO coupling component and a baseband DC offset component of the LO leakage signal. First and second variable current sources are adjusted by the controller to provide first and second DC offsets to the first and second baseband signals, respectively. The first and second DC offsets reduce the direct LO coupling component. Third and fourth variable current sources are subsequently adjusted by the controller to provide third and fourth DC offsets to the first and second baseband signals, respectively. The third and fourth DC offsets reduce the baseband DC component. Overall, reducing the direct LO coupling component and the baseband DC component reduces a power of the LO leakage signal.

31 Claims, 8 Drawing Sheets

US 7,657,236 B2

TRANSMITTER HAVING REDUCED LOCAL OSCILLATOR (LO) LEAKAGE BY DETERMINING DIRECT LO COUPLING AND BASEBAND DC OFFSET

BACKGROUND OF THE INVENTION

1. Field of the Invention

The present invention generally relates to local oscillator (LO) leakage signal reduction. More specifically, the present invention provides independent baseband compensation for a direct LO coupling component and a baseband DC offset component of a LO leakage signal within a transmitter output signal.

2. Background Art

Generally, a wireless radio frequency (RF) transmitter includes a baseband section and an RF section. Baseband information signals are generated and manipulated within the baseband section. The baseband information signals are up-converted and further manipulated within the RF section to produce a transmitter output signal.

Random device mismatches within the constituent components of the baseband section can produce DC offsets within the baseband information signals. These baseband DC offsets can be up-converted by the transmitter to produce a LO leakage signal. Undesired direct coupling of LO signals to the RF section can also produce or enhance a LO leakage signal. The LO leakage signal is an undesirable signal that can interfere with the subsequent detection and demodulation of the transmitter output signal.

The quality of the transmitter output signal suffers if a transmitter fails to compensate for both the direct LO coupling component and the baseband DC offset component of a LO leakage signal. Techniques to reduce a power of the LO leakage signal often estimate and compensate for the direct LO coupling component and the baseband DC offset component simultaneously. Such techniques are expensive in terms of required processing power and required additional components.

BRIEF SUMMARY OF THE INVENTION

Accordingly, the present invention provides independent baseband compensation for a direct LO coupling component and a baseband DC offset component of a LO leakage signal within a transmitter output signal.

In one embodiment, a transmitter generates a transmitter output signal from a first baseband signal and second baseband signal. The transmitter includes a detector to detect the LO leakage signal in the transmitter output signal. A controller coupled to the detector determines a direct LO coupling component and a baseband DC offset component of the LO leakage signal. First and second variable current sources are independently adjusted by the controller to provide first and second DC offsets to the first and second baseband signals, respectively. The first and second DC offsets reduce the direct LO coupling component. Consequently, a power of the LO leakage signal is reduced. Third and fourth variable current sources are subsequently adjusted by the controller to provide third and fourth DC offsets to the first and second baseband signals, respectively. The third and fourth DC offsets reduce the baseband DC offset component. In turn, the power of the LO leakage signal is further reduced.

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

Figure 8:
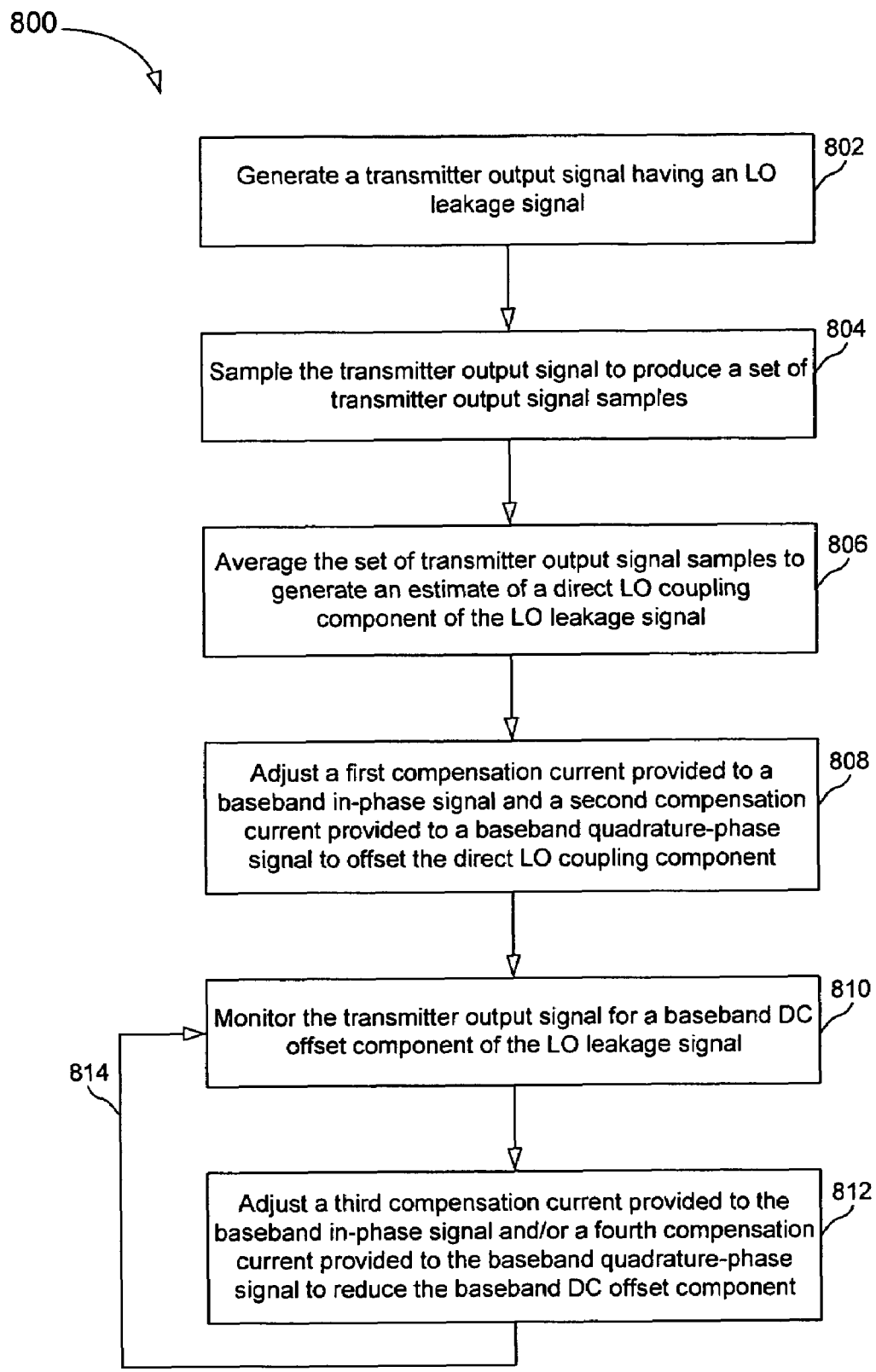

FIG. 8 provides a flowchart that illustrates operational steps for reducing a power of a LO leakage signal in a transmitter output signal in accordance with the present invention.

DETAILED DESCRIPTION OF THE INVENTION

Figure 1:
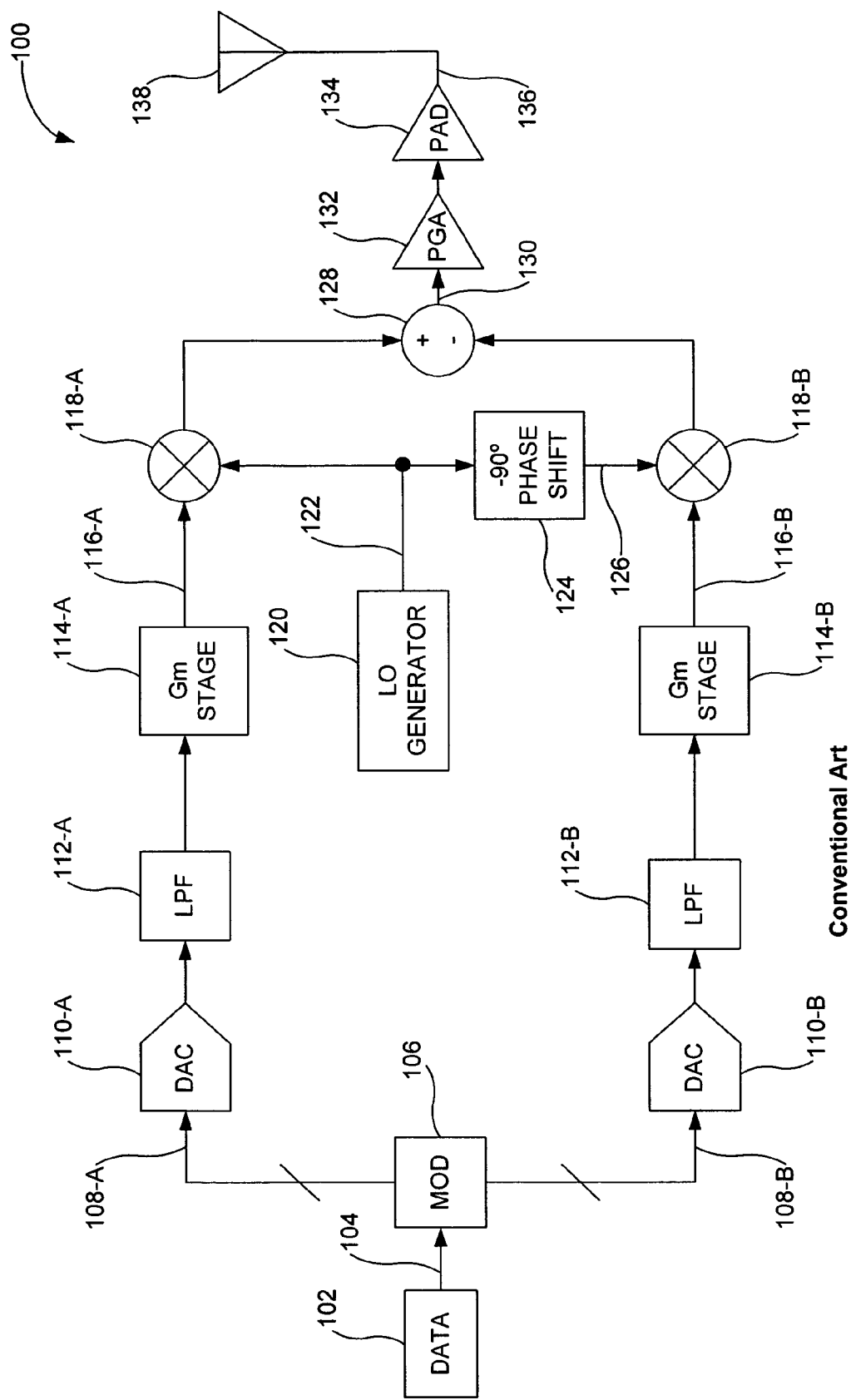
FIG. 1 illustrates a conventional wireless transmitter.

FIG. 1 illustrates a conventional wireless transmitter 100. The conventional wireless transmitter 100 includes an information source 102. The information source 102 generates a data signal 104. The data signal 104 is a sequence of bits. The information source 102 provides the data signal 104 to a modulator 106. The modulator 106 encodes and modulates the data signal 104 and provides two modulation channels (e.g., an in-phase channel and a quadrature-phase channel). Specifically, the modulator 106 generates a modulated data signal 108-A and an associated modulated data signal 108-B. The modulated data signals 108-A and 108-B can be baseband signals or can be signals centered at an intermediate frequency (IF). The modulated data signals 108-A and 108-B can be considered to be in-phase and quadrature-phase information signals, respectively. At the output of the modulator 106, the modulated data signals 108-A and 108-B are multiple-bit digital signals.

As illustrated in FIG. 1, the modulated data signals 108-A and 108-B are provided to digital-to-analog converters (DACs) 110-A and 110-B and to low-pass filters (LPFs) 112-A and 112-B, respectively. The DAC 110-A converts the modulated data signal 108-A from a digital signal into a differential analog signal. The LPF 112-A isolates an appropriate portion of the modulated data signal 108-A for transmission. Similarly, the DAC 110-B converts the modulated data signal 108-B from a digital signal to a differential analog signal and the LPF 112-B isolates an appropriate portion of the modulated data signal 108-B for transmission.

A transconductance stage 114-A converts the modulated data signal 108-A from a differential voltage signal into a differential current signal. Likewise, a transconductance stage 114-B converts the modulated data signal 108-B from a differential voltage signal into a differential current signal.

The conventional wireless transmitter 100 further includes a pair of mixers 118-A and 118-B. A first input of the mixer 118-A receives an in-phase data signal 116-A from an output of the transconductance stage 114-A. A first input of the mixer 118-B receives a quadrature-phase data signal 116-B from an output of the transconductance stage 114-B. A local oscillator (LO) generator 120 generates an in-phase LO signal 122. A phase shifter 124 shifts the phase of the in-phase LO signal 122 by approximately −90° to generate a quadrature-phase LO signal 126. A second input of the mixer 118-A receives the in-phase LO signal 122 and a second input of the mixer 118-B receives the quadrature-phase LO signal 126.

The in-phase LO signal 122 and the quadrature-phase LO signal 126 are typically high frequency signals. For example, the in-phase LO signal 122 and the quadrature-phase LO signal 126 can be radio frequency (RF) signals. Further, the in-phase LO signal 122 and the quadrature-phase LO signal 126 approximately have the same frequency (i.e., a LO frequency, $f_{LO}$). The mixer 118-A uses the in-phase LO signal 122 to up-convert the in-phase data signal 116-A to a higher frequency. Specifically, the mixer 118-A receives the in-phase data signal 116-A as a differential analog signal and produces a frequency-translated version of the in-phase data signal 116-A that is also a differential analog signal.

Similarly, the mixer 118-B uses the quadrature-phase LO signal 126 to up-convert the quadrature-phase data signal 116-B to a higher frequency. The mixer 118-B receives the in-phase data signal 116-B as a differential analog signal and produces a frequency-translated version of the modulated data signal 116-B that is also a differential analog signal. In this way, the in-phase data signal 116-A and the quadrature-phase data signal 116-B can be up-converted to an RF frequency by the mixers 118-A and 118-B, respectively.

As further illustrated in FIG. 1, the outputs of the mixers 118-A and 118-B are provided to an inverting summer 128. The inverting summer 128 subtracts the differential components of the differential analog signal produced by the mixer 118-B from the corresponding differential components of the differential analog signal produced by the mixer 118-A. In other words, the inverting summer 128 sums the output of the mixer 118-A with an inverted version of the output of the mixer 118-B. As a result, the inverting summer 128 produces an up-converted modulated signal 130. The up-converted modulated signal 130 is a differential signal.

The inverting summer 128 is coupled to a programmable gain amplifier (PGA) 132. The PGA 132 amplifies the up-converted modulated signal 130. The gain of the PGA 132 is typically programmable, or variable, and so can be adjusted during operation of the conventional wireless transmitter 100. The PGA 132 is coupled to a power amplifier driver (PAD) 134. The PAD 134 also amplifies the up-converted modulated signal 130 and produces a transmitter output signal 136. The gain of the PAD 134 is typically fixed and so cannot be adjusted during operation of the conventional wireless transmitter 100. The transmitter output signal 136 is provided to an antenna 138 for wireless transmission.

The mixers 118-A and 118-B divide the conventional wireless transmitter 100 into a baseband section and an RF section. Specifically, the information source 102, the modulator 106, the DACs 110-A and 110-B, the LPFs 112-A and 112-B and the transconductance stages 114-A and 114-B are constituent components of the baseband section of the conventional wireless transmitter 100. In contrast, the LO generator 120, the phase shifter 124, the inverting summer 128, the PGA 132, the PAD 134 and the antenna 138 are constituent components of the RF section of the conventional wireless transmitter 100.

The conventional wireless transmitter 100 can be a generalized in-phase/quadrature-phase transmitter. Specifically, the conventional wireless transmitter 100 can be adapted to provide various types of modulated data signals 108-A and 108-B by implementing a variety of modulation schemes with the modulator 106. Further, the conventional wireless transmitter 100 can be adapted to up-convert the in-phase data signal 116-A and the quadrature-phase data signal 116-B onto a variety of transmission channel bandwidths by altering the LPFs 112-A and 112-B and the in-phase LO signal 122 and the quadrature-phase LO signal 126. Overall, the conventional wireless transmitter 100 can be modified to provide a transmitter output signal 136 that conforms to a variety of communication protocols, standards, or known schemes. The conventional wireless transmitter 100 can be implemented, for example, as a Institute of Electrical and Electronics Engineers (IEEE) 802.11 a/g transmitter.

The conventional wireless transmitter 100 can operate as a single sideband transmitter. Under ideal conditions, the transmitter output signal 136 produced by the conventional wireless transmitter 100 includes a main information signal only. Under non-ideal conditions, the amplified modulated signal 130 includes the main information signal and a LO leakage signal. The LO leakage signal is an undesirable signal that can interfere with the reception and demodulation of the main information signal by a corresponding wireless receiver. Further, the LO leakage signal does not convey information provided by the information source 102.

The LO leakage signal can be caused by two main sources. A first source is a baseband DC offset within the baseband section of the conventional wireless transmitter 100. A baseband DC offset can be caused by a DC offset between the differential components of the in-phase data signal 116-A. A DC offset between the differential components of the in-phase data signal 116-A causes the in-phase data signal 116-A, at the input of the mixer 118-A, to include a DC component. As a result, the DC component of the in-phase data signal 116-A is up-converted to the frequency of the in-phase LO signal 122 (i.e., the LO frequency, $f_{LO}$) and can subsequently appear in the transmitter output signal 136.

Alternatively, the baseband DC offset can be caused by a DC offset between the differential components of the quadrature-phase data signal 116-B. A DC offset between the differential components of the quadrature-phase data signal 116-B causes the quadrature-phase data signal 116-B, at the input of the mixer 118-B, to include a DC component. As a result, the DC component of the quadrature-phase data signal 116-B is up-converted to the frequency of the quadrature-phase LO signal 126 (i.e., the LO frequency, $f_{LO}$) and can subsequently appear in the transmitter output signal 136.

A second contributing source of the LO leakage signal is direct LO coupling. Direct LO coupling refers to the undesired coupling of the in-phase LO signal 122 or the quadrature-phase LO signal 126 to any unintended portion of the RF section of the conventional wireless transmitter 100 (e.g., the output of the mixer 118-A or the mixer 118-B, the input of the PGA 132, the input of the PAD 134 or the output of the PAD 134). Direct LO coupling can therefore also cause a signal centered at the LO frequency, $f_{LO}$, to appear in the transmitter output signal 136.

The LO leakage signal is not generated or produced under ideal operating conditionals of the conventional wireless transmitter 100. Ideal operating conditions therefore requires the in-phase data signal 116-A and the quadrature-phase data signal 116-B to not include a DC component at the inputs of the mixers 118-A and 118-B, respectively. Ideal operating conditions of the conventional wireless transmitter 100 also requires the in-phase LO signal 122 and the quadrature-phase LO signal 126 to not be directly coupled to any unintended portion of the RF section of the conventional wireless transmitter. That is, the in-phase LO signal 122 and the quadrature-phase LO signal 126 should not be directly coupled to the output of the mixer 118-A or the mixer 118-B, the input of the PGA 132, the input of the PAD 134 or the output of the PAD 134.

Figure 2A:
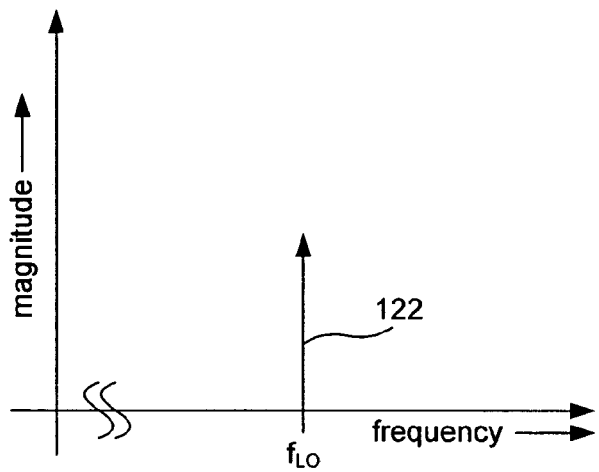
FIG. 2A illustrates a magnitude spectrum of an in-phase LO signal (or a quadrature-phase LO signal) depicted in FIG. 1.

FIG. 2A illustrates the magnitude spectrum of the in-phase LO signal 122 (or the quadrature-phase LO signal 126). The in-phase LO signal 122 comprises a single tone centered at the LO frequency, $f_{LO}$. As previously mentioned, the LO frequency is typically a frequency much greater than baseband. Mathematically, the in-phase LO signal 122 can be represented as:

$$LO_I = \cos X \quad (1)$$
$$= \cos(2\pi f_{LO} t) \quad (2)$$

and the quadrature-phase LO signal 126 can be represented as:

$$LO_Q = \sin X \quad (3)$$
$$= \sin(2\pi f_{LO} t) \quad (4)$$

Figure 2B:
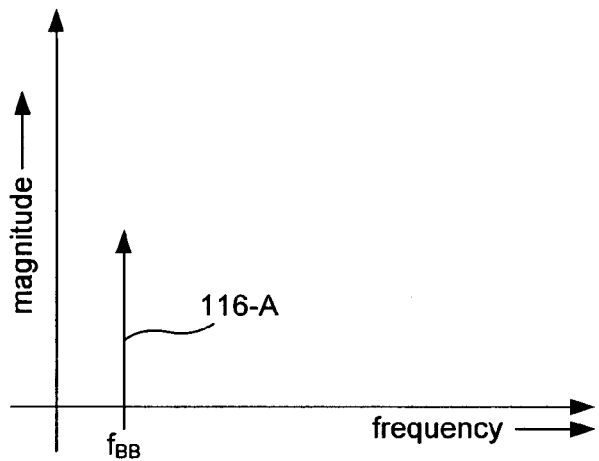
FIG. 2B illustrates a magnitude spectrum of an in-phase data signal (or a quadrature-phase data signal) depicted in FIG. 1.

FIG. 2B illustrates the magnitude spectrum of the in-phase data signal 116-A (or the quadrature-phase data signal 116-B). For simplicity, the in-phase data signal 116-A is depicted as comprising a single tone centered at a signal frequency, $f_{BB}$. As previously mentioned, the signal frequency is typically a relatively low frequency with respect to the LO frequency. When the modulator 106 outputs a single tone signal, the in-phase data signal 116-A can be mathematically represented as:

$$S_I = A \cos Y \quad (5)$$
$$= A\cos(2\pi f_{BB} t) \quad (6)$$

and the quadrature-phase data signal 116-B can be represented as:

$$S_Q = A \sin Y \quad (7)$$
$$= A\sin(2\pi f_{BB} t) \quad (8)$$

where A represents peak amplitude.

Equations 5 through 8 correspond to the ideal case where neither the in-phase data signal 116-A nor the quadrature-phase data signal 116-B includes a DC offset component. Given this condition, and given the further condition that neither the in-phase LO signal 122 nor the quadrature-phase LO signal 126 is undesirably coupled to the RF section of the conventional wireless transmitter 100, the transmitter output signal 136 can be represented as:

$$TX_{output} = S_I \cdot LO_I - S_Q \cdot LO_Q \quad (9)$$
$$= A\cos(2\pi f_{BB} t)\cos(2\pi f_{LO} t) - A\sin(2\pi f_{BB} t)\sin(2\pi f_{LO} t) \quad (10)$$
$$= A\cos[2\pi(f_{LO} + f_{BB})t] \quad (11)$$

where the gain of the PGA 132 and the PAD 134 are represented as having unity gain for simplicity.

Figure 2C:
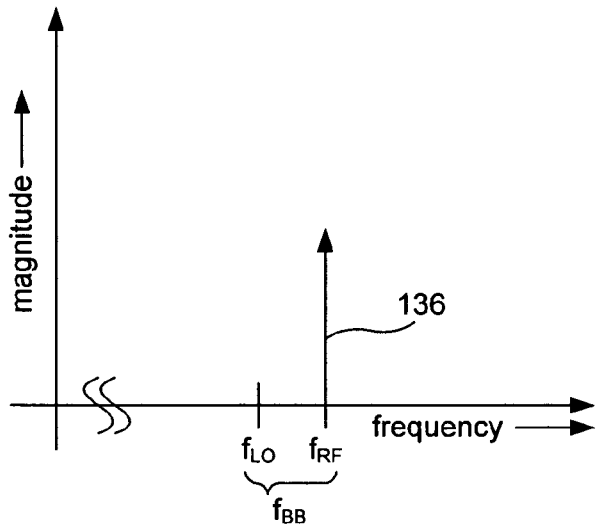
FIG. 2C illustrates a magnitude spectrum of a transmitter output signal depicted in FIG. 1 having a main information signal component only.

Equation 11 shows that the transmitter output signal 136 comprises a main information signal component only. That is, the transmitter output signal 136 does not include a LO leakage signal. FIG. 2C illustrates the magnitude spectrum of the transmitter output signal 136 when (1) neither the in-phase data signal 116-A nor the quadrature-phase data signal 116-B includes a DC offset component and (2) neither the in-phase LO signal 122 nor the quadrature-phase LO signal 126 is unintentionally coupled to the RF section of the conventional wireless transmitter. As shown in FIG. 2C, the transmitter output signal 136 comprises a single tone centered at a radio frequency, $f_{RF}$, such that:

$$f_{RF} = f_{LO} + f_{BB} \quad (12)$$

FIG. 2C further shows that the main information signal of the transmitter output signal 136 is not corrupted by a LO leakage signal under ideal operating conditions of the conventional wireless transmitter 100.

As previously mentioned, the transmitter output signal 136 includes a LO leakage signal when the conventional wireless transmitter 100 operates under non-ideal conditions. Each contributing source of the LO leakage signal is discussed below.

Both the in-phase data signal 116-A and the quadrature-phase data signal 116-B are differential signals. The in-phase data signal 116-A can be represented as:

$$S_I = I_p - I_n \quad (13)$$

where $I_p$ represents a first differential component of the in-phase data signal 116-A and $I_n$ represents a second differential component of the in-phase data signal 116-A. The first differential component of the in-phase data signal 116-A can be represented as:

$$I_p = DC_p + \frac{A}{2}\cos(2\pi f_{BB} t) \quad (14)$$

and the second differential component of the in-phase data signal 116-A can be represented as:

$$I_n = DC_n - \frac{A}{2}\cos(2\pi f_{BB}t) \qquad (15)$$

where $DC_p$ represents a DC component of $I_p$ and $DC_n$ represents a DC component of $I_n$.

Under ideal conditions, a DC imbalance does not exist between the first and second differential components of the in-phase data signal 116-A. That is, under ideal conditions, the DC components of the first and second differential components of the in-phase data signal 116-A are equal (i.e., $DC_p = DC_n$) such that:

$$S_I = DC_P + \frac{A}{2}\cos(2\pi f_{BB}t) - DC_n + \frac{A}{2}\cos(2\pi f_{BB}t) \qquad (16)$$

$$= A\cos(2\pi f_{BB}t) \qquad (17)$$

Equation 17 corresponds to the ideal case represented by Equation 6 and is illustrated by FIG. 2B.

Figure 3A:
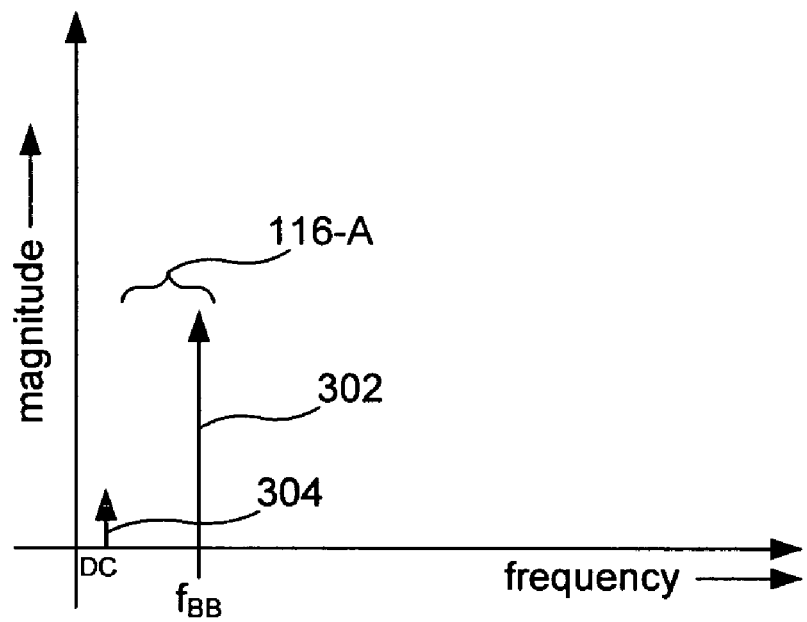
FIG. 3A illustrates the magnitude spectrum of the in-phase data signal (or the quadrature-phase data signal) having a main baseband signal component and a DC offset component.

Under non-ideal conditions, a DC imbalance exists between the first and second differential components of the in-phase data signal 116-A (i.e., $DC_p \neq DC_n$). When a DC imbalance exists between the first and second differential components of the in-phase data signal 116-A, the in-phase data signal 116-A includes a DC offset term, $DC_{offset}$, such that:

$$S_I = DC_p - DC_n + A\cos(2\pi f_{BB}t) \qquad (18)$$

$$= DC_{offset} + A\cos(2\pi f_{BB}t) \qquad (19)$$

where $DC_{offset}$ can be either a positive offset or a negative offset. FIG. 3A illustrates the magnitude spectrum of the in-phase data signal 116-A having a main baseband signal component 302 and a DC offset component 304. Comparing FIG. 3A to FIG. 2B reveals that a DC imbalance between the first and second differential components of the in-phase data signal 116-A results in the in-phase data signal 116-A including spurious energy centered around DC (i.e., the DC offset component 304).

Figure 3B:
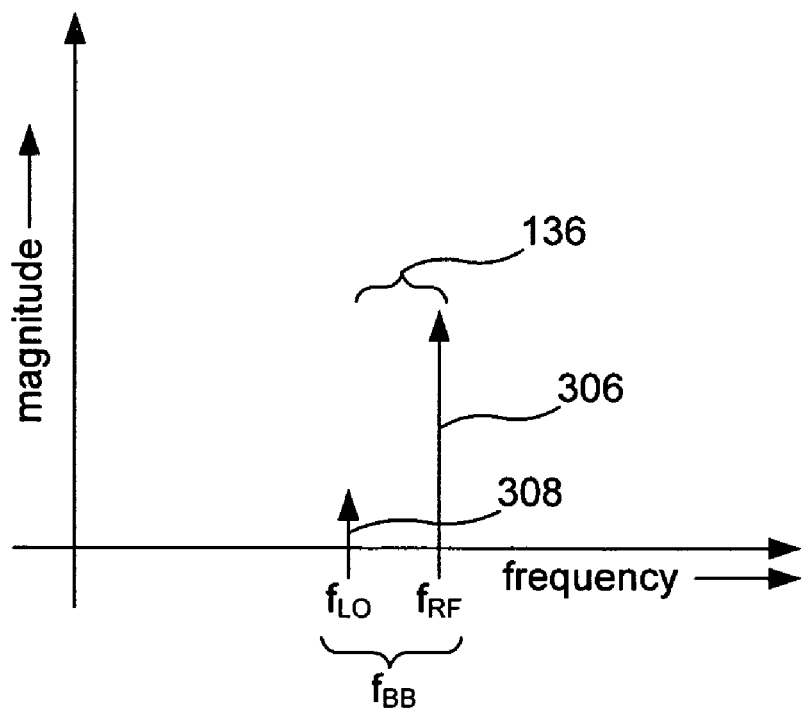
FIG. 3B illustrates the magnitude spectrum of the transmitter output signal having a main information signal component and a LO leakage signal component.

The DC offset component 304 of the in-phase data signal 116-A is fed to the mixer 118-A. As a result, the DC offset component 304 is frequency translated or up-converted to the LO frequency, $f_{LO}$. FIG. 3B illustrates the magnitude spectrum of the transmitter output signal 136 generated from the in-phase data signal 116-A having a DC offset component 304. As shown in FIG. 3B, the transmitter output signal 136 includes a main information signal component 306 centered at the RF frequency, $f_{RF}$, and a LO leakage signal 308 centered at the LO frequency, $f_{LO}$. Therefore, a DC imbalance between the first and second differential components of the in-phase data signal 116-A causes the transmitter output signal 136 to include the LO leakage signal 308.

The foregoing discussion has focused on how a DC imbalance between the first and second differential components of the in-phase data signal 116-A can produce the LO leakage signal 308. It is important to note, however, that a DC imbalance between the first and second differential components of the quadrature-phase data signal 116-B can also produce the LO leakage signal 308. That is, a DC offset component 304 within the qaudrature-phase data signal 116-B can also be frequency translated or up-converted to the LO frequency, $f_{LO}$. Therefore, the LO leakage signal 308 depicted in FIG. 3B can be caused by either the in-phase data signal 116-A or the quadrature-phase data signal 116-B having a DC offset component 304. Either variant of this first contributing source to the LO leakage signal 308 are therefore caused by baseband DC offsets within the baseband section of the conventional wireless transmitter 100.

DC imbalances between the first and second differential components of the in-phase data signal 116-A and between the first and second differential components of the quadrature-phase data signal 116-B are caused by device mismatches in the baseband section of the conventional wireless transmitter 100. Specifically, device mismatches within the DACs 110-A and 110-B, the LPFs 112-A and 112-B or the transconductance stages 114-A and 114-B can contribute to the generation of the DC component 304 within the in-phase data signal 116-A or the quadrature-phase data signal 116-B, respectively. Under ideal conditions, the constituent components of each device within the baseband portion of the conventional wireless transmitter 100 are identical and perfectly matched. However, under typical manufacturing and operating scenarios, device mismatch is non-negligible and contributes to the generation of the LO leakage signal 308 as depicted in FIG. 3B.

The second contributing source of the LO leakage signal 308 within the transmitter output signal 136 can be direct LO coupling. Specifically, unintentional coupling of the in-phase LO signal 122 to the outputs of the mixers 118-A and 118-B, the input of the PGA 132, the input of the PAD 134 or the output of the PAD 134 can produce or enhance the LO leakage signal 308. Likewise, unintentional coupling of the quadrature-phase LO signal 126 to the outputs of the mixers 118-A and 118-B, the input of the PGA 132, the input of the PAD 134 or the output of the PAD 134 can produce or enhance the LO leakage signal 308.

Direct LO coupling introduces an interfering tone (i.e., the LO leakage signal 308) centered at the LO frequency, $f_{LO}$, within the RF portion of the conventional wireless transmitter. Nevertheless, the LO leakage signal 308 caused by direct LO coupling can be modeled as being the result of a DC offset within the baseband portion of the conventional wireless transmitter 100. Therefore, the direct LO coupling contribution to the LO leakage signal 308 depicted in FIG. 3B can be understood as being caused by a DC offset component 304 within the in-phase data signal 116-A or the qaudrature-phase data signal 116-B.

Figure 4:
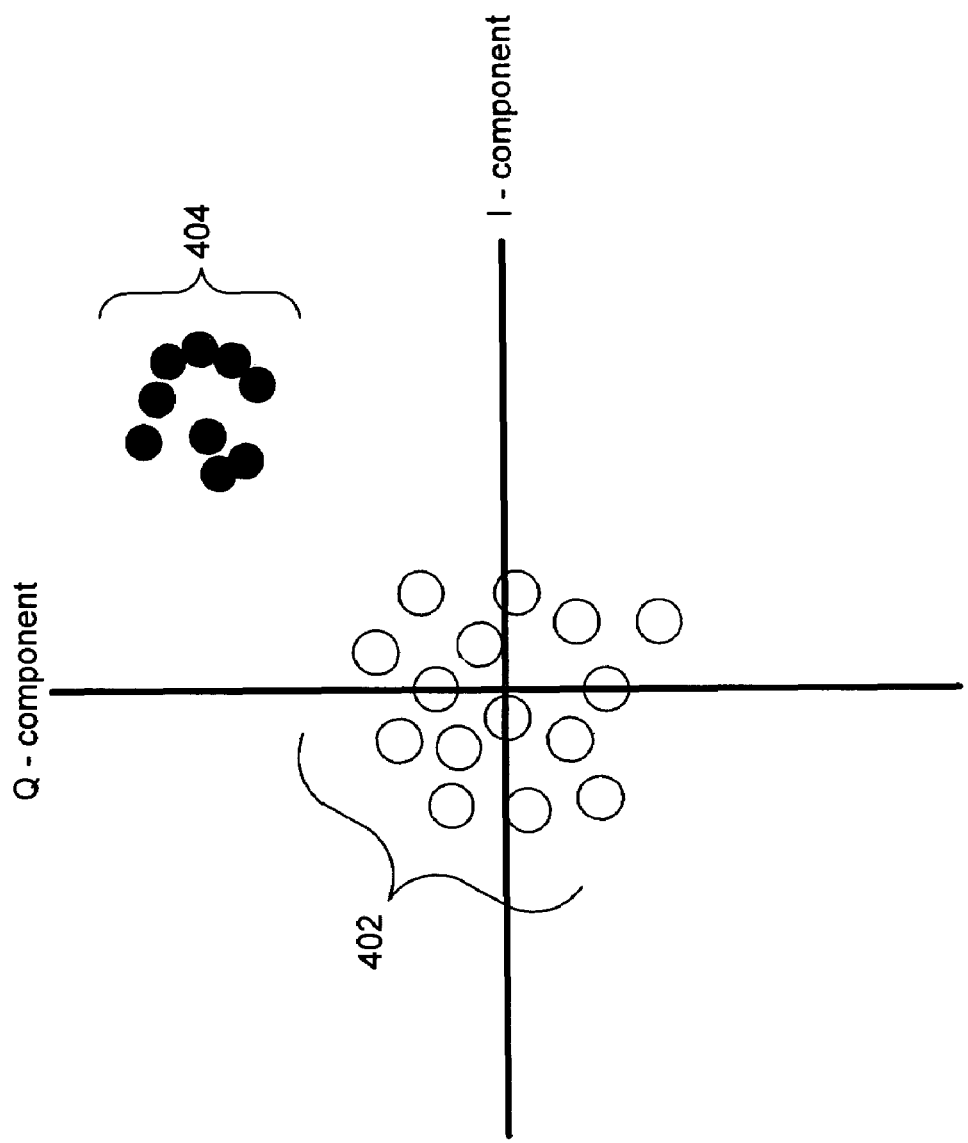
FIG. 4 illustrates a comparison of a direct LO coupling component and a baseband DC offset component of the LO leakage signal depicted in FIG. 3B.

FIG. 4 illustrates a comparison of the direct LO coupling contribution and the baseband DC offset contribution to the LO leakage signal 308. Specifically, FIG. 4 depicts a breakdown of the in-phase and quadrature-phase components of the direct LO coupling component and the baseband DC offset component of the LO leakage signal 308. A first group of statistical data points 402 includes statistical samples of the baseband DC offset component. Collectively, the statistical data points 402 are randomly distributed around the origin of the in-phase and quadrature-phase graph and have a null average.

Those statistical data points 402 centered about the in-phase axis are solely caused by a DC imbalance between the first and second differential components of the in-phase data signal 116-A. Those statistical data 402 points centered about the quadrature-phase axis are solely caused by a DC imbalance between the first and second differential components of the quadrature-phase data signal 116-B. The remaining statistical data points 402 are caused by DC imbalances between the first and second differential components of both the in-phase data signal 116-A and the quadrature-phase data signal 116-B.

A second group of statistical data points 404 includes statistical samples of the direct LO coupling component of the LO leakage signal 308. Collectively, the statistical data points 404 are randomly distributed about a vector (i.e., a combined LO signal) within the in-phase and quadrature-phase graph and have a non-zero average. Compared to the statistical data points 402, the statistical data points 404 generally have larger magnitudes. Each group of statistical data points 402 and 404 can produce or enhance the LO leakage signal 308.

The conventional wireless transmitter 100 need only transmit the main information signal component 306 of the transmitter output signal 136 to a corresponding wireless receiver to enable the transfer of information. Generally, the main information signal component 306 is not a single tone as depicted in FIG. 3B. Rather, in many applications, the main information signal component 306 has a continuous bandwidth approximately equal to $2 \cdot f_{BB}$ and approximately centered about the LO frequency $f_{LO}$. Therefore, when the LO leakage signal 308 is present within the transmitter output signal 136, the LO leakage signal 308 can be approximately centered in the middle of the main information signal component 306. As a result, the LO leakage signal 308 can interfere with the subsequent detection and demodulation of the main information signal component 306 by a corresponding wireless receiver.

LO leakage is a measure of a difference in power between the main information signal component 306 and the LO leakage signal 308. LO leakage reduction techniques are often used to improve the quality of the transmitter output signal 136 (i.e., reduce the power of the LO leakage signal 308). LO leakage reduction on the order of 35 dB is often desirable to ensure that the LO leakage signal 308 does not interfere with the subsequent detection and demodulation of the main information signal component 306.

The conventional wireless transmitter 100 is incapable of reducing the power of the LO leakage signal 308. That is, the conventional wireless transmitter 100 has no mechanism by which the baseband DC offset component or the direct LO coupling component of the LO leakage signal 308 can be reduced or eliminated. Therefore, what is needed is a wireless transmitter that is capable of reducing the power of the LO leakage signal 308. Specifically, what is needed is a wireless transmitter having a LO leakage reduction mechanism that can reduce or eliminate both a baseband DC offset component and a direct LO coupling component of a LO leakage signal so as to minimize or reduce an overall power of the LO leakage signal in a transmitter output signal. Further, the wireless transmitter should employ a LO leakage reduction mechanism that is high-speed, efficient and low cost.

Figure 5:
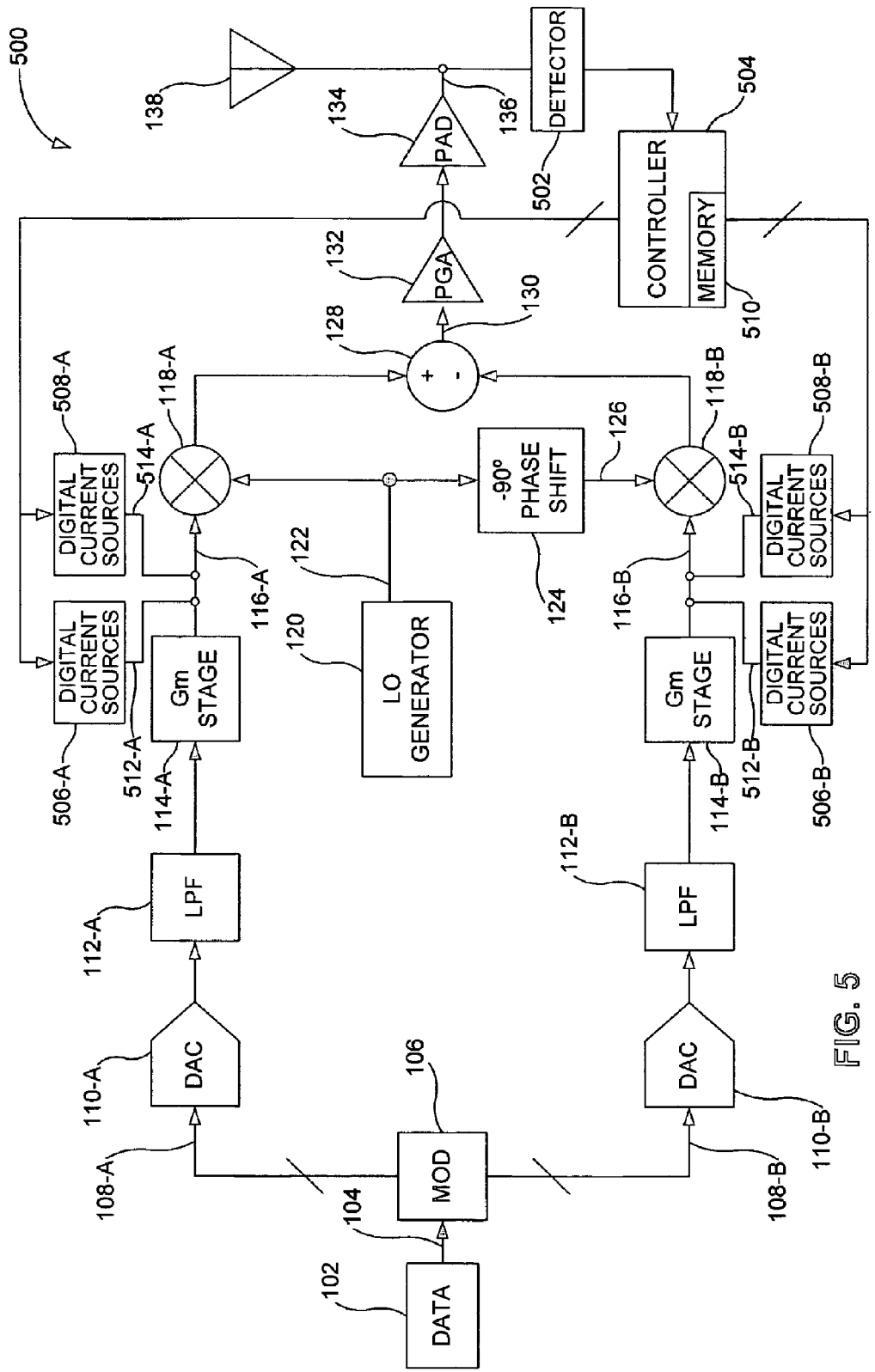
FIG. 5 illustrates a wireless transmitter having independent baseband compensation for a direct LO coupling component and a baseband DC offset component of a LO leakage signal within a transmitter output signal according to the present invention.

FIG. 5 illustrates a wireless transmitter 500 capable of reducing or eliminating both a baseband DC offset component and a direct LO coupling component of a LO leakage signal so as to minimize or reduce an overall power of the LO leakage signal in a transmitter output signal. Specifically, the wireless transmitter 500 is capable of reducing or eliminating a LO leakage signal at the output of the wireless transmitter 500 by separately reducing both contributing sources or causes of a LO leakage signal.

As shown in FIG. 5, the wireless transmitter 500 includes a detector 502. The detector 502 is coupled to the output of the PAD 134. The detector 502 can detect the presence of the LO leakage signal 308 within the transmitter output signal 136.

The detector 502 is coupled to a controller 504. The controller 504 is coupled to digital current sources 506-A, 506-B, 508-A and 508-B. The digital current sources 506-A and 508-A are coupled between the transconductance stage 114-A and the mixer 118-A. The digital current sources 506-B and 508-B are coupled between the transconductance stage 114-B and the mixer 118-B.

The digital current sources 506-A and 506-B are configured to compensate for the direct LO coupling component of the LO leakage signal 308. As previously mentioned, the direct LO coupling component can be modeled as being caused by DC components within the in-phase data signal 116-A and the quadrature-phase data signal 116-B. Therefore, the digital current sources 506-A and 506-B can compensate for direct LO coupling component by independently introducing DC components within the in-phase data signal 116-A and the quadrature-phase data signal 116-B to offset the direct LO coupling component.

The digital current sources 508-A and 508-B are configured to compensate for the baseband DC offset component of the LO leakage signal 308. The digital current sources 508-A and 508-B compensate for baseband DC offsets by independently adjusting the DC offset components 304 of the in-phase data signal 116-A and the quadrature-phase data signal 116-B. The digital current sources 508-A and 508-B compensate for the baseband DC offset component after the digital current sources 506-A and 506-B compensate for the direct LO coupling component.

The digital current sources 506-A and 506-B provide variable or adjustable compensation currents 512-A and 512-B to the inputs of the mixers 118-A and 118-B, respectively. The variable compensation currents 512-A and 512-B are differential currents adjusted by the controller 504. The controller 504 can adjust the variable compensation currents 512-A and 512-B based on the direct LO coupling component detected by the detector 502. The variable compensation currents 512-A and 512-B can comprise digitally controlled constant current sources.

Similarly, the digital current sources 508-A and 508-B provide variable or adjustable compensation currents 514-A and 514-B to the inputs of the mixers 118-A and 118-B, respectively. The variable compensation currents 514-A and 514-B are also differential currents adjusted by the controller 504. The controller 504 can adjust the variable compensation currents 514-A and 514-B based on the baseband DC offset component detected by the detector 502. The variable compensation currents 514-A and 514-B can comprise digitally controlled constant current sources.

The wireless transmitter 500 can separately estimate and compensate for the baseband DC offset component and the direct LO coupling component of the LO leakage signal 308. To do so, the wireless transmitter 500 first estimates and compensates for the direct LO coupling component and then estimates and compensates for the baseband DC offset component.

To estimate the direct LO coupling component, the wireless transmitter 500 analyzes a statistically significant set of samples of the transmitter output signal 136. To do so, the wireless transmitter 500 samples the transmitter output signal 136 to generate a set of transmitter output signal samples. The detector 502 and/or the controller 504 can sample the transmitter output signal 136. The detector 502 and/or the controller 504 then averages the set of transmitter output signal samples to determine the direct LO coupling component. As previously mentioned, the baseband DC offset component of the LO leakage signal 308 has a null average. Therefore, averaging the set of transmitter output signal samples approximately cancels out the baseband DC offset component, thereby providing an estimate of the direct LO coupling component (after accounting for a known power of the main information signal component 306 of the transmitter output signal 136). A statistically significant amount of samples are used to provide a statistically significant estimate of the direct LO coupling component.

Armed with an estimate of the direct LO coupling component of the LO leakage signal 308, the controller 504 can adjust the variable compensation currents 512-A and 512-B to compensate for the direct LO coupling component. The direct LO coupling contribution is compensated by introducing appropriate counter DC offsets within the in-phase data signal 116-A and the quadrature-phase data signal 116-B using the variable compensation currents 512-A an 512-B, respectively.

The variable compensation currents 512-A an 512-B can be adjusted to have the same value or different values. Further, the variable compensation currents 512-A an 512-B can be adjusted according to a variety of techniques. For example, the controller 502 can first minimize the direct LO coupling component caused by the in-phase data signal 116-A by first adjusting the variable compensation current 512-A. Once the direct LO coupling component is minimized with respect to the variable compensation current 512-A, the controller 502 can then adjust the variable compensation current 512-B to further reduce the direct LO coupling component caused by the quadrature-phase data signal 116-B.

The controller 504 can include a memory 510 for storing the settings of the variable compensation currents 512-A and 512-B based on an estimate of the direct LO coupling contribution. For example, when the settings of the variable current sources 512-A and 512-B are determined for a given estimate of the direct LO coupling contribution, the settings can be set or fixed for subsequent operation of the wireless transmitter 500. The settings of the variable current sources 512-A and 512-B can be updated by occasionally averaging (through either a periodic or an a periodic process) a set of transmitter output signal samples. Alternatively, the memory 510 can be loaded with a predetermined or "factory-installed" estimate of the direct LO coupling component and corresponding compensation settings. For example, the settings of the variable current sources 512-A and 512-B can be set in firmware governing operation of the wireless transmitter 500.

The settings for the variable current sources 514-A and 514-B can be determined after the settings for the variable current sources 512-A and 512-B are set. To adjust the variable current sources 514-A and 514-B, the detector 502 or controller 504 samples the transmitter output signal 136. The detector or controller 504 can then measure a power of the LO leakage signal 308 to generate an estimate of the baseband DC offset component. Specifically, given that the controller 504 is currently compensating for direct LO coupling component, the LO leakage signal 308 approximately only comprises the baseband DC offset component. The controller 504, based on the estimate of the baseband DC offset component, can then adjust the variable compensation currents 514-A and 514-B to reduce or eliminate the baseband DC offset contribution to the LO leakage signal 308.

The detector 502 or the controller 504 can measure a power of the LO leakage signal 308 based on a single transmitter output signal sample or a set of transmitter output signal samples. The settings of the variable current sources 514-A and 514-B can then be determined for each subsequent sample or set of samples of the transmitter output signal 136.

The variable compensation currents 514-A an 514-B can be adjusted to have the same value or different values. Further, the variable compensation currents 514-A an 514-B can be adjusted according to a variety of techniques. For example, the controller 502 can first minimize the baseband DC offset contribution caused by the in-phase data signal 116-A by adjusting the variable compensation current 514-A. Once the baseband DC offset is minimized with respect to the variable compensation current 514-A, the controller 502 can adjust the variable compensation current 514-B to reduce the baseband DC offset caused by the quadrature-phase data signal 116-B.

As previously mentioned, the magnitude of the direct LO coupling component of the LO leakage signal 308 is generally larger than the magnitude of the baseband DC offset component. Therefore, in many applications, the digital current sources 506-A and 506-B may be larger than the digital current sources 508-A and 508-B in order to provide a wider range of adjustable compensation.

Many conventional LO leakage signal reduction systems compensate for both contributing sources to the LO leakage signal simultaneously. That is, many conventional LO leakage signal reduction systems do not compensate for the baseband DC offset component after first compensating for the direct LO coupling component. Large digital current sources providing a wide range of compensation are needed to simultaneously compensate for both contributing sources. Further, the processing speed needs of conventional LO leakage reduction systems are greatly increased when simultaneous compensation for both sources is required, particularly for frequent compensation updating. In turn, the overall costs to implement these conventional LO leakage signal reduction systems are increased.

In contrast to conventional LO leakage signal reduction systems, the present invention provides a high-speed and efficient apparatus and method to compensate for a LO leakage signal caused by multiple contributing sources. By first determining and compensating for the direct LO coupling component of a LO leakage signal, the present invention reduces costs in terms of time and additional components. Further, processing speed needs can be reduced if only updates to the baseband DC offset component are made on a sample-by-sample basis.

As shown in FIG. 5, the digital current sources 506-A and 508-B and the digital current sources 506-A and 508-B are coupled to the inputs of the mixers 118-A and 118-B, respectively. It is important to note, however, that baseband compensation of a LO leakage signal in accordance with the present invention can be made at any point along the in-phase and quadrature-phase channels of the wireless transmitter 500, prior to the mixers 118-A and 118-B, respectively.

Figure 6:
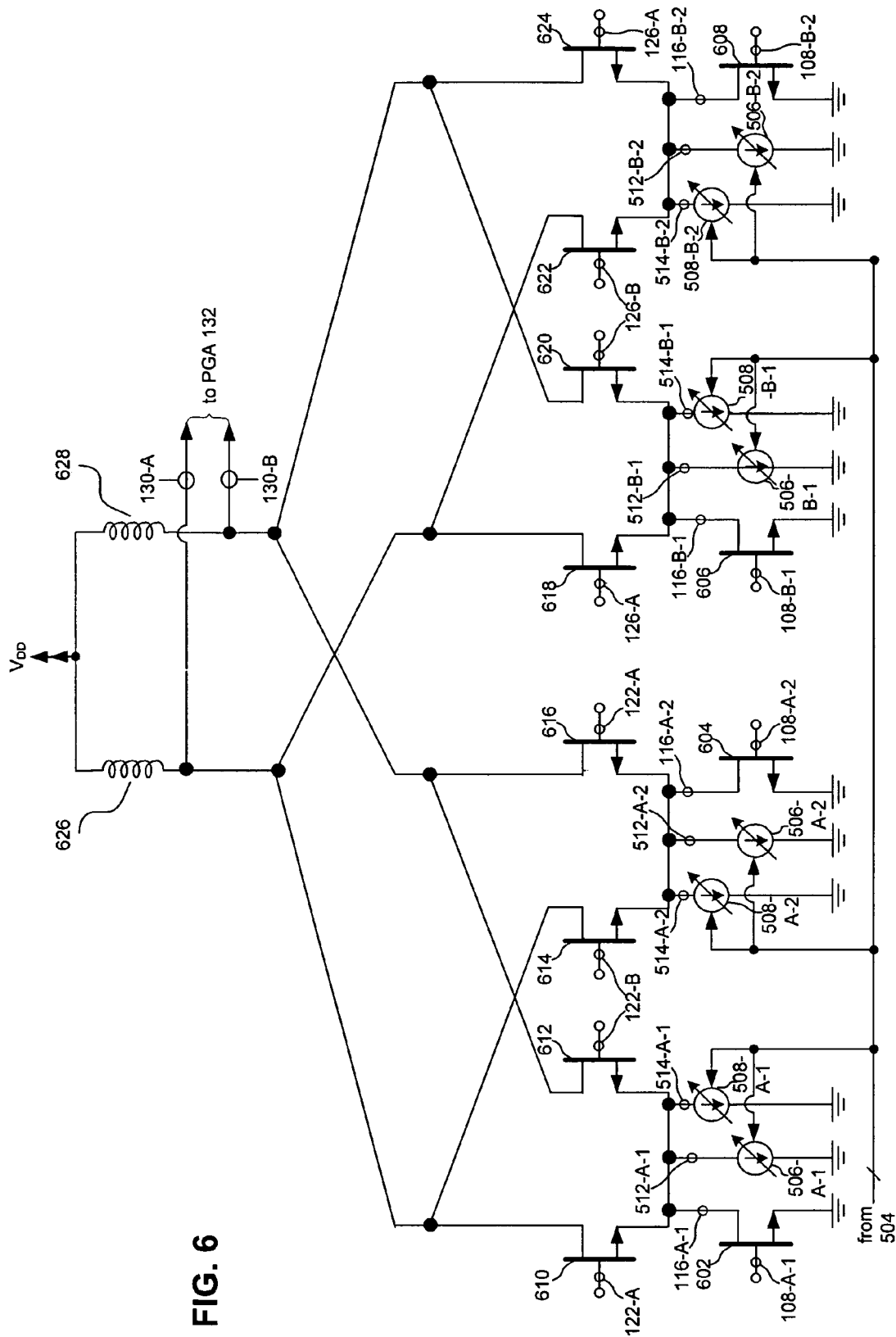
FIG. 6 illustrates a configuration of a portion of the wireless transmitter depicted in FIG. 5.

FIG. 6 illustrates an implementation of the baseband compensation of a LO leakage signal having a baseband DC offset component and a direct LO coupling component provided by the present invention. Specifically, FIG. 6 illustrates a possible configuration and interaction of the transconductance stages 114-A and 114-B, the mixers 118-A and 118-B, the digital current sources 506-A and 506-B, the digital current sources 508-A and 508-B and the inverting summer 128.

As shown in FIG. 6, the differential modulated data signal 108-A (shown as modulated data signals 108-A-1 and 108-A-2) is applied to the gates of transistors 602 and 604. The transistors 602 and 604 are each Field-Effect Transistors (FETs). The FETs 602 and 604 represent a portion of the transconductance stage 114-A. Similarly, the differential modulated data signal 108-B (shown as modulated data signals 108-B-1 and 108-B-2) is applied to the gates of FETs 606 and 608. The FETs 606 and 608 represent a portion of the transconductance stage 114-B.

The FET 602 provides a first component of the in-phase data signal 116-A (shown as 116-A-1) to the sources of FETs 610 and 612. The gate of the FET 610 is coupled to a first differential component of the in-phase LO signal 122 (shown as 122-A). The gate of the FET 612 is coupled to a second differential component of the in-phase LO signal 122 (shown as 122-B). The FET 604 provides a second component of the in-phase data signal 116-A (shown as 116-A-2) to the sources of FETs 614 and 616. The gate of the FET 614 is coupled to the second differential component of the in-phase LO signal 122-B. The gate of the FET 616 is coupled to the first differential component of the in-phase LO signal 122-A.

The FETs 610 and 612 form a first differential amplifier pair and the FETs 614 and 616 form a second differential amplifier pair. Collectively, the FETs 610, 612, 614 and 616 are arranged as a Gilbert cell and represent a possible configuration of the mixer 118-A. FETs 610, 612, 614 and 616 operate to gate the baseband in-phase data signal 116-A provided by the FETs 602 and 604 at the frequency of the in-phase LO signal 122, so as to up-convert the baseband in-phase data signals 116-A-1 and 116-A-2.

The FET 606 provides a first component of the quadrature-phase data signal 116-B (shown as 116-B-1) to the sources of FETs 618 and 620. The gate of the FET 618 is coupled to a first differential component of the quadrature-phase LO signal 126 (shown as 126-A). The gate of the FET 620 is coupled to a second differential component of the LO input signal 126 (shown as 126-B). The FET 608 provides a second component of the quadrature-phase data signal 116-B (shown as 116-B-2) to the sources of FETs 622 and 624. The gate of the FET 622 is coupled to the second differential component of the quadrature-phase LO signal 126-B. The gate of the FET 624 is coupled to the first differential component of the quadrature-phase LO signal 126-A.

The FETs 618 and 620 form a third differential amplifier pair and the FETs 622 and 624 form a fourth differential amplifier pair. Collectively, the FETs 618, 620, 622 and 624 are arranged as a Gilbert cell and represent a possible configuration of the mixer 118-B. FETs 618, 620, 622 and 624 operate to gate the baseband in-phase data signal 116-B provided by the FETs 606 and 608 at the frequency of the quadrature-phase LO signal 126, so as to up-convert the baseband quadrature-phase data signals 116-B-1 and 116-B-2.

The drains or outputs of the FETs 610 and 614 are further connected to the drains or outputs of the FETs 618 and 622 and applied to an inductive load 626. The inductive load 626 is coupled to a voltage supply $V_{DD}$ and represents a portion of the differential load representing the remaining sections of the wireless transmitter 500 (e.g., the PGA 132, the PAD 134 and the antenna 138). Connecting the outputs of the FETs 610, 614, 618 and 622 in this way implements a portion of the inverting summer 128 to combine corresponding differential in-phase and quadrature-phase components and produces a first differential component of the up-converted modulated signal 130 (shown as 130-A).

In a similar manner, the drains or outputs of the FETs 612 and 616 are further connected to the drains or outputs of the FETs 620 and 624 and applied to an inductive load 628. The inductive load 628 is coupled to the voltage supply $V_{DD}$ and represents a portion of the differential load of the remaining sections of the wireless transmitter 500 (e.g., the PGA 132, the PAD 134 and the antenna 138). Connecting the outputs of the FETs 612, 616, 620 and 624 in this way implements a portion of the inverting summer 128 to combine corresponding differential in-phase and quadrature-phase components and produces a second differential component of the up-converted modulated signal 130 (shown as 130-B). The first and second differential components of the up-converted modulated signal 130-A and 130-B can form a single sideband RF signal having both in-phase and quadrature-phase information. The first and second differential components of the up-converted modulated signal 130-A and 130-B are shown as being fed to the PGA 132.

As further shown in FIG. 6, the sources of the FETs 610, 612, 614 and 616 are coupled to the variable digital current source 506-A (shown as differential digital current sources 506-A-1 and 506-A-2) and to the variable digital current sources 508-A (shown as differential digital current sources 508-A-1 and 508-A-2). The digital current source 506-A-1 provides variable compensation current 512-A-1 and the digital current source 508-A-1 provides variable compensation current 514-A-1 to the sources of the FETs 610 and 612. The digital current source 506-A-2 provides variable compensation current 512-A-2 and the digital current source 508-A-2 provides variable compensation current 514-A-2 to the sources of the FETs 614 and 616.

The sources of the FETs 618, 620, 622 and 624 are coupled to the variable digital current source 506-B (shown as differential digital current sources 506-B-1 and 506-B-2) and to the variable digital current sources 508-B (shown as differential digital current sources 508-B-1 and 508-B-2). The digital current source 506-B-1 provides variable compensation current 512-B-1 and the digital current source 508-B-1 provides variable compensation current 514-B-1 to the sources of the FETs 618 and 620. The digital current source 506-B-2 provides variable compensation current 512-B-2 and the digital current source 508-B-2 provides variable compensation currents 514-B-2 to the sources of the FETs 622 and 624.

The variable compensation current 512-A-1 and the variable compensation current 514-A-1 are used to provide DC offsets to the first component of the in-phase data signal 116-A-1. The variable compensation currents 512-A-2 and the variable compensation current 514-A-2 are used to provide DC offsets to the second component of the in-phase data signal 116-A-2. Similarly, the variable compensation current 512-B-1 and the variable compensation current 514-B-1 are used to provide DC offsets to the first component of the quadrature-phase data signal 116-B-1. The variable compensation currents 512-B-2 and the variable compensation current 514-B-2 are used to provide DC offsets to the second component of the quadrature-phase data signal 116-B-2.

Together, the variable compensation currents 512-A-1, 512-A-2, 512-B-1 and 512-B-2 are used to compensate for the direct LO coupling component of the LO leakage signal 308. The variable compensation currents 512-A-1, 512-A-2, 512-B-1 and 512-B-2 can be configured to provided an expected range of compensation based on such factors as, for example, the expected magnitudes of the modulated data signals 108-A and 108-B and the expected magnitudes of the in-phase LO signal 122 and the quadrature-phase LO signal 126.

The variable compensation currents 514-A-1, 514-A-2, 514-B-1 and 514-B-2 are used to compensate for the baseband DC offset component of the LO leakage signal. The variable compensation currents 514-A-1, 514-A-2, 514-B-1 and 514-B-2 can be configured to provided an expected range of compensation based on such factors as, for example, the expected magnitudes of the modulated data signals 108-A and 108-B and the expected magnitudes of the DC offsets of the in-phase data signal 116-A and the quadrature-phase data signal 116-B. The expected magnitudes of the DC offsets of the in-phase data signal 116-A and the quadrature-phase data signal 116-B can be based on an expected device mismatch between the components within the baseband portion of the wireless transmitter 500. Expected device mismatch can be provided, for example, by a foundry or manufacturer of the baseband components.

Each of the differential variable compensation currents are controlled by the controller 504. The differential variable compensation currents are independently tuned or adjusted by the controller 504. Therefore, each of the differential variable compensation currents can have the same value or a different value as a counterpart differential variable compensation current. For example, the differential variable compensation current 512-A-1 can have the same or different value as differential variable compensation current 512-A-2.

Each digital current source can comprise one or more constant current sources. Each of the one or more constant current sources can be summed to produce a differential variable compensation current. The controller can vary the size or value of a differential variable compensation current by activating or deactivating one or more of the constant current sources. The controller 504 can adjust the value of each differential variable compensation current at any time during operation of the wireless transmitter 500.

It is important to note that biasing arrangements, including DC bias voltages, passive loads and AC coupling of inputs, are not shown in FIG. 6 for simplicity. It will be apparent to one skilled in the pertinent art that modifications to the baseband compensation of a LO leakage signal depicted in FIG. 6 can be made without departing from the spirit and scope of the present invention. Further, it is important to note that each of the digital current sources depicted in FIG. 6 can be used to provide or supplement the biasing of the FETs depicted in FIG. 6.

Figure 7:
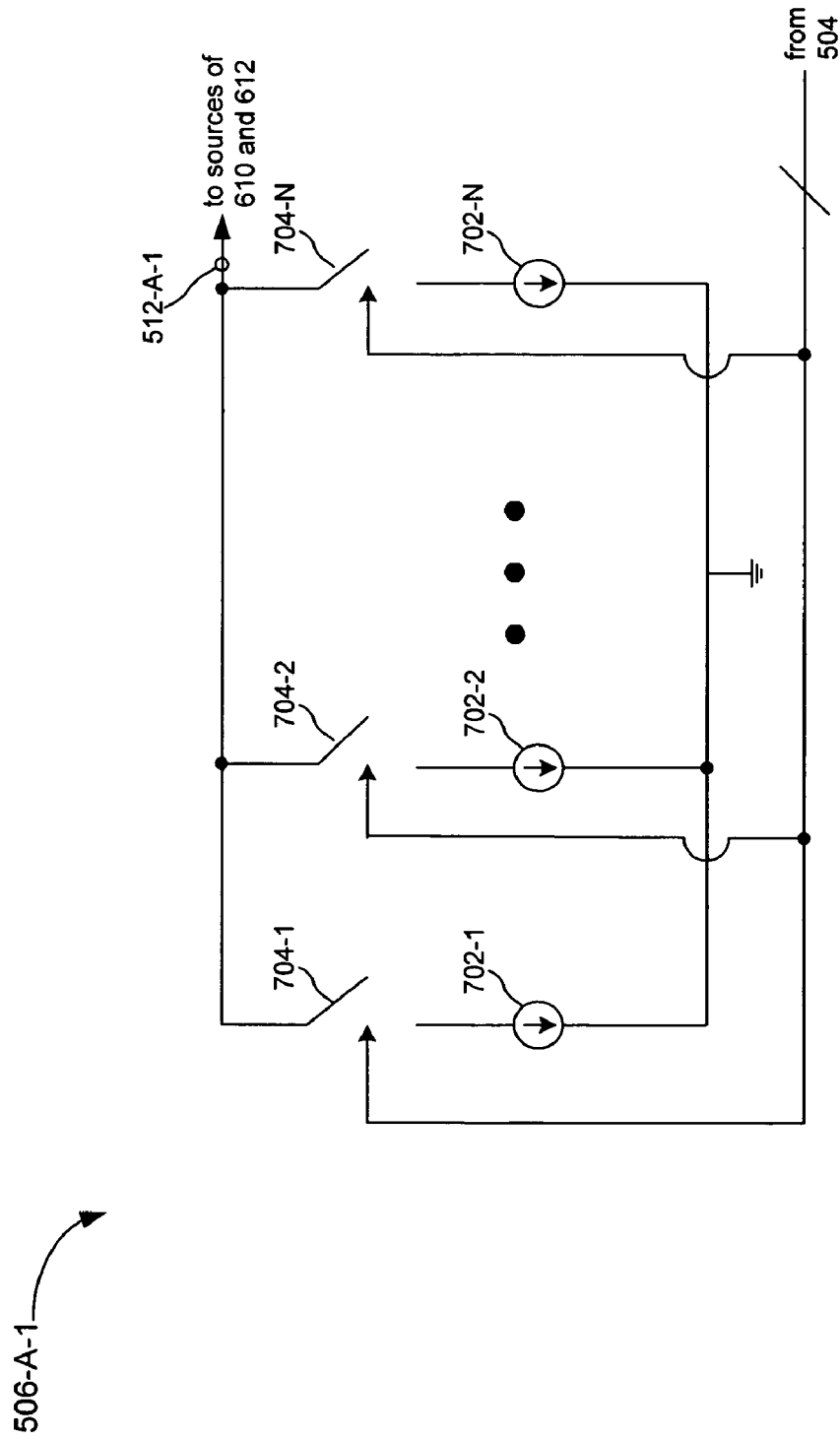
FIG. 7 illustrates a configuration of a digital current source depicted in FIG. 6.

FIG. 7 illustrates a configuration of the digital current source 506-A-1 that is used to provide the differential variable compensation current 512-A-1. As shown in FIG. 7, the digital current source 506-A-1 is coupled to the sources of the FETs 610 and 612. The digital current source 506-A-1 includes a number of current sources 702-1 through 702-N. Each of the current sources 702-1 through 702-N is coupled between the sources of the FETs 610 and 612 and a ground by corresponding switches 704-1 through 704-N. The switches 704-1 through 704-N are controlled by the controller 504. Activating one or more of the switches 704-1 through 704-N correspondingly increases the differential variable compensation current 512-A-1. Deactivating one or more of the switches 704-1 through 704-N correspondingly decreases the differential variable compensation current 512-A-1.

The value of the current sources 702-1 through 702-N can be varied. For example, the current sources 702-1 through 702-N can be similarly-valued constant current sources, differently-valued constant current sources or binary ratio current sources. The size or value of the differential variable compensation current 506-A-1 depends on the number of switches 704-1 through 704-N activated by the controller 504. For example, during operation of the wireless transmitter 500, the controller 504 can either activate, deactivate or maintain the current operating state of any of the current sources 702-1 through 704-N. The digital current sources 508-A-1, 506-A-2, 508-A-2, 506-B-1, 508-B-1, 506-B-2 and 508-B-2 can be configured in a similar manner as shown in FIG. 7.

FIG. 8 provides a flowchart 800 that illustrates operational steps for reducing a direct LO coupling component and a baseband DC offset component of a LO leakage signal in a transmitter output signal in accordance with the present invention. The invention is not limited to this operational description. Rather, it will be apparent to persons skilled in the relevant art(s) from the teachings herein that other operational control flows are within the scope and spirit of the present invention. In the following discussion, the steps in FIG. 8 are described.

At step 802, a transmitter output signal is generated. The transmitter output signal includes a main information signal and a LO leakage signal. The transmitter output signal can be generated by summing an up-converted baseband in-phase data signal and an inverted version of an up-converted baseband quadrature-phase data signal. The transmitter output signal can be a single sideband RF signal containing in-phase and quadrature-phase information.

The LO leakage signal can comprise a direct LO coupling component and a baseband DC offset component. The direct LO coupling component can be caused by undesired coupling of an in-phase LO signal and/or a quadrature-phase LO signal to the transmitter output signal. The direct LO coupling component can be a random offset having a non-zero average. The baseband DC offset component can be caused by random device mismatches within the baseband in-phase and/or baseband quadrature-phase signal paths. The baseband DC offset component can be a random offset having an average of approximately zero.

At step 804, the transmitter output signal is sampled to produce a set of transmitter output signal samples.

At step 806, the set of transmitter output signal samples are averaged to generate an estimate of a direct LO coupling component to the LO leakage signal. Averaging the set of transmitter output signal samples approximately cancels out the baseband DC offset component such that an estimate of the direct LO coupling component can be determined. An expected power of the main information signal can be accounted for in determining the estimate of the direct LO coupling component.

At step 808, a first compensation current is adjusted and provided to the baseband in-phase data signal and a second compensation current is adjusted and provided to the baseband quadrature-phase data signal. The first and second compensation currents provide adjustable DC offsets to the baseband in-phase and quadrature-phase data signals, respectively. The DC offsets provided by the first and second compensation currents can offset the direct LO coupling component of the LO leakage signal. In this way, the direct LO coupling component can be substantially reduced or eliminated. As a result, a power of the LO leakage signal can be reduced. Both the first and second compensation currents can be differential currents and can be independently adjusted.

At step 810, the transmitter output signal is monitored. Specifically, the transmitter output signal is monitored for the presence of the baseband DC offset component caused by baseband device mismatch. The transmitter output signal can be monitored by sampling the transmitter output signal and measuring a value of the random baseband DC offset component. For example, an estimate of the baseband DC offset component can be generated by sampling the transmitter output signal and measuring a power of the LO leakage signal. An expected power of the main information signal can be accounted for in determining the estimate of the baseband DC offset component.

At step 812, a third compensation current is adjusted and provided to the baseband in-phase data signal and/or a fourth compensation current is adjusted and provided to the baseband quadrature-phase data signal. The third and fourth compensation currents provide adjustable DC offsets to the baseband in-phase and quadrature-phase data signals, respectively. The DC offsets provided by the third and fourth compensation currents can offset the baseband DC offset component of the LO leakage signal. In this way, the baseband DC offset component can be reduced or eliminated. In turn, the power of the LO leakage signal can be reduced or substantially eliminated. Both the third and fourth compensation currents can be differential currents and can be independently adjusted.

Step 814 depicts the iterative monitoring and compensation provided by the present invention for counteracting the baseband DC offset component. Specifically, step 814 shows that the present invention provides a method for continuously monitoring the baseband DC offset component of the LO leakage signal accompanied by a subsequent adjustment of the third and/or fourth compensation currents. Together, steps 812 and 814 can be a periodic or aperiodic process. Steps 812 and 814 can be implemented, for example, whenever a baseband DC offset component is detected. Alternatively, steps 812 and 814 can always be performed on each sample of the transmitter output signal. Steps 812 and 814 could also be implemented whenever the power of the LO leakage signal exceeds a predetermined threshold.

The adjustment to the first and second compensation currents at step 808 can also be a periodic or aperiodic process. Alternatively, the adjustment to the first and second compensation currents at step 808 can be made when a transmitter that generates the transmitter output signal is first turned on or powered up. Further, the adjustment to the first and second compensation currents at step 808 can be preprogrammed and consistently applied during operation of a transmitter that produces the transmitter output signal. Specifically, step 808 can include the retrieval of preprogrammed settings for the first and second compensation currents, thereby obviating the need to perform steps 804 and 806.

It will be apparent to persons skilled in the relevant art(s) from the teachings herein that the present invention is not limited to the examples provided in the forgoing description. That is, the spirit and scope of the present invention supports modifications and adjustment of the examples provided herein so that the present invention is applicable to, for example, single channel transmitters or multiple channel transmitters.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A method for reducing a power of a local oscillator (LO) leakage signal in a transmitter output signal, comprising:
   generating the transmitter output signal from a first baseband signal and a second baseband signal;
   determining a direct LO coupling component of the LO leakage signal;
   adjusting a DC component of the first baseband signal and adjusting a DC component of the second baseband signal to offset the direct LO coupling component, thereby reducing the power of the LO leakage signal by a first amount;
   determining a baseband DC offset component of the LO leakage signal that is separate from said step of determining a direct LO coupling component; and
   adjusting the DC component of at least one of the baseband signals to offset the baseband DC component, thereby reducing the power of the LO leakage signal by a second amount.

2. The method of claim 1, wherein generating the transmitter output signal comprises:
   up-converting the first baseband signal using a first LO signal to generate a first output signal;
   up-converting the second baseband signal using a second LO signal to generate a second output signal; and
   summing the first output signal and an inverted version of the second output signal to form the transmitter output signal.

3. The method of claim 1, wherein determining the direct LO coupling component comprises retrieving a stored estimate of the direct LO coupling component.

4. The method of claim 3, wherein:
   adjusting the DC component of the first baseband signal comprises adjusting the DC component of the first baseband signal based on the stored estimate of the direct LO coupling component; and
   adjusting the DC component of the second baseband signal comprises adjusting the DC component of the second baseband signal based on the stored estimate of the direct LO coupling component.

5. The method of claim 1, wherein determining the direct LO coupling component comprises retrieving a first stored setting of the DC component of the first baseband signal and retrieving a second stored setting of the DC component of the second baseband signal.

6. The method of claim 5, wherein:
   adjusting the DC component of the first baseband signal comprises adjusting the DC component of the first baseband signal based on the first stored setting; and
   adjusting the DC component of the second baseband signal comprises adjusting the DC component of the second baseband signal based on the second stored setting.

7. The method of claim 1, wherein determining the direct LO coupling component comprises sampling the transmitter output signal to generate a plurality of transmitter output signal samples.

8. The method of claim 7, wherein determining the direct LO coupling component further comprises averaging the plurality of transmitter output signal samples to estimate the direct LO coupling requirement.

9. The method of claim 1, wherein adjusting the DC component of the first baseband signal comprises adjusting a direct LO coupling compensation current applied to the first baseband signal.

10. The method of claim 9, wherein adjusting the direct LO coupling compensation current comprises adjusting a DC offset of at least one differential component of the first baseband signal.

11. The method of claim 1, wherein adjusting the DC component of the second baseband signal comprises adjusting a direct LO coupling compensation current applied to the second baseband signal.

12. The method of claim 11, wherein adjusting the direct LO coupling compensation current comprises adjusting a DC offset of at least one differential component of the second baseband signal.

13. The method of claim 1, wherein determining the baseband DC offset component comprises sampling the transmitter output signal to generate a transmitter output signal sample.

14. The method of claim 13, wherein determining the baseband DC offset component further comprises measuring the power of the LO leakage signal based on the transmitter signal sample.

15. The method of claim 1, wherein adjusting the DC component of at least one baseband signal comprises adjusting a baseband DC offset compensation current applied to the first baseband signal.

16. The method of claim 15, wherein adjusting the baseband DC offset compensation current comprises adjusting a DC offset of at least one differential component of the first baseband signal.

17. The method of claim 1, wherein adjusting the DC component of at least one baseband signal comprises adjusting a baseband DC offset compensation current applied to the second baseband signal.

18. The method of claim 17, wherein adjusting the baseband DC offset compensation current comprises adjusting a DC offset of at least one differential component of the second baseband signal.

19. A transmitter, comprising:
a detector coupled to an output of the transmitter to sample a transmitter output signal having a local oscillator (LO) leakage signal, the transmitter output signal generated from a first differential baseband signal and a second differential baseband signal;
a controller coupled to the detector to determine a direct LO coupling component and a baseband DC offset component of the LO leakage signal;
a first differential variable current source to provide a first differential DC offset to the first differential baseband signal;
a second differential variable current source to provide a second differential DC offset to the second differential baseband signal;
a third differential variable current source to provide a third differential DC offset to the first differential baseband signal; and
a fourth differential variable current source to provide a fourth differential DC offset to the second differential baseband signal;
wherein the controller adjusts the first and second differential DC offsets to reduce the direct LO coupling component and adjusts the third and fourth differential DC offsets to reduce the baseband DC offset.

20. The transmitter of claim 19, further comprising a memory coupled to the controller, wherein the controller determines the direct LO coupling component based on an estimate stored in the memory.

21. The transmitter of claim 19, further comprising a memory coupled to the controller, wherein the memory stores a first predetermined setting of the first differential DC offset and second predetermined setting of the second differential DC offset.

22. The transmitter of claim 21, wherein the controller adjusts the first differential DC offset based on the first predetermined setting and adjusts the second differential DC offset based on the second predetermined setting.

23. The transmitter of claim 19, wherein the detector generates a plurality of transmitter output signal samples and the controller determines the direct LO coupling component based on an average value of the plurality of transmitter output signal samples.

24. The transmitter of claim 19, wherein the detector generates a transmitter output signal sample and the controller determines the baseband DC offset based on the transmitter output signal sample after reducing the direct LO coupling component.

25. The transmitter of claim 19, wherein each differential variable current source comprises:
a first bank of one or more constant current sources; and
a second bank of one or more constant current sources;
wherein each of the one or more constant current sources of the first and second banks are controlled by a corresponding switch.

26. The transmitter of claim 19, wherein the controller independently adjusts the first and second differential DC offsets to reduce the direct LO coupling component.

27. The transmitter of claim 19, wherein the controller independently adjusts the third and fourth differential DC offsets to reduce the baseband DC offset.

28. A method for reducing a power of a local oscillator (LO) leakage signal in a transmitter output signal, comprising:
generating the transmitter output signal from a baseband signal;
determining a direct LO coupling component of the LO leakage signal;
adjusting a DC component of the baseband signal to offset the direct LO coupling component, thereby reducing the power of the LO leakage signal by a first amount;
determining a baseband DC offset component of the LO leakage signal that is separate from the step of determining a direct LO coupling component; and
adjusting the DC component of the baseband signal to offset the baseband DC component, thereby reducing the power of the LO leakage signal by a second amount.

29. A transmitter, comprising:
a detector coupled to an output of the transmitter to sample a transmitter output signal having a local oscillator (LO) leakage signal, the transmitter output signal generated from a differential baseband signal;
a controller coupled to the detector to determine a direct LO coupling component and a baseband DC offset component of the LO leakage signal;
a first differential variable current source to provide a first differential DC offset to the differential baseband signal;
a second differential variable current source to provide a second differential DC offset to the differential baseband signal;
wherein the controller adjusts the first differential DC offset to reduce the direct LO coupling component and adjusts the second differential DC offset to reduce the baseband DC offset.

30. The method of claim 1, wherein the step of determining a baseband DC offset component of the LO leakage signal is performed after the step of determining a direct LO coupling component of the LO leakage signal.

31. The method of claim 28, wherein the step of determining a baseband DC offset component of the LO leakage signal is performed after the step of determining a direct LO coupling component of the LO leakage signal.

* * * * *

UNITED STATES PATENT AND TRADEMARK OFFICE
CERTIFICATE OF CORRECTION

PATENT NO.       : 7,657,236 B2  Page 1 of 1
APPLICATION NO. : 11/204339
DATED            : February 2, 2010
INVENTOR(S)      : Meng-An Pan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 692 days.

Signed and Sealed this

Thirtieth Day of November, 2010

David J. Kappos
*Director of the United States Patent and Trademark Office*